United States Patent [19]

Solin et al.

[11] 3,851,274

[45] Nov. 26, 1974

[54] RECIRCULATING LIQUID-NITROGEN-COOLANT SYSTEM FOR SOLID-STATE LASERS

[75] Inventors: Stuart A. Solin; Joseph Doehler, both of Chicago, Ill.

[73] Assignee: The United States of America as represented by the United States Atomic Energy Commission, Washington, D.C.

[22] Filed: June 29, 1973

[21] Appl. No.: 375,205

[52] U.S. Cl. ............... 331/94.5 P, 62/118, 62/435, 62/467, 62/514, 165/106, 165/107, 165/156
[51] Int. Cl. ............................................. H01s 3/00
[58] Field of Search ........ 331/94.5; 330/4.3; 62/118, 62/435, 467, 514; 165/106, 107, 156

[56] References Cited
UNITED STATES PATENTS
3,361,989  1/1968  Sirons .............................. 331/94.5

OTHER PUBLICATIONS

Burkhalter, "Lasers and their Effects," Annual Report, AD 433218, April 1, 1964, pp. 1–9, Report avail.
Review of Scientific Instruments, Vol. 35, Nov., 1964, pp. 1608–1609.
Dessert, Acta Electronica Vol. 10, No. 3, 1966, pp. 295–314, (pp. 307–309 especially).

Primary Examiner—Ronald L. Wibert
Assistant Examiner—R. J. Webster
Attorney, Agent, or Firm—John A. Horan; Arthur A. Chrum; Robert J. Fisher

[57] ABSTRACT

A recirculating liquid-nitrogen-coolant system for solid-state lasers permits prolonged continuous operation of the laser at liquid-nitrogen temperatures without boiling the liquid-nitrogen in contact with the laser rod. A liquid-coolant pump, submerged beneath the surface of liquid-nitrogen contained within a Dewar vessel at atmospheric pressure, pumps liquid-nitrogen at an increased pressure through a heat exchanger, similarly submerged within the liquid-nitrogen at atmospheric pressure, to a laser head supporting a solid laser rod. The pressurized liquid-nitrogen, which has been cooled below its effective boiling point in passing through the heat exchanger, passes over the surface of the solid laser rod and absorbs heat from the laser rod without the liquid-nitrogen's temperature being raised above the increased effective boiling temperature, thereby precluding boiling of the liquid-nitrogen. The liquid-nitrogen exits from the laser head and is returned to the Dewar vessel for recirculation. Recirculation of the liquid-nitrogen from the Dewar vessel through the laser head permits continuous cooling of the laser during prolonged and continuous operation.

12 Claims, 5 Drawing Figures

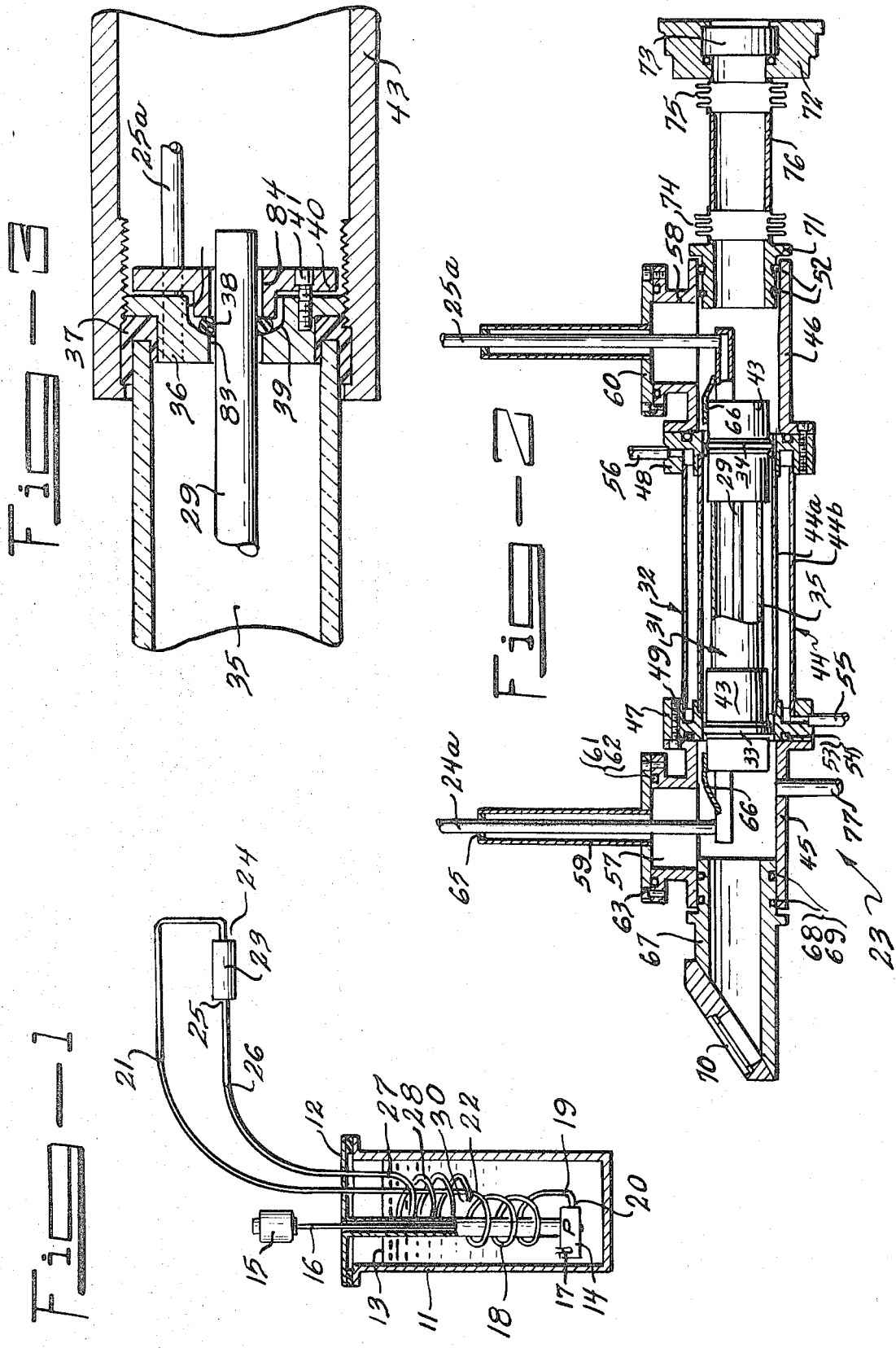

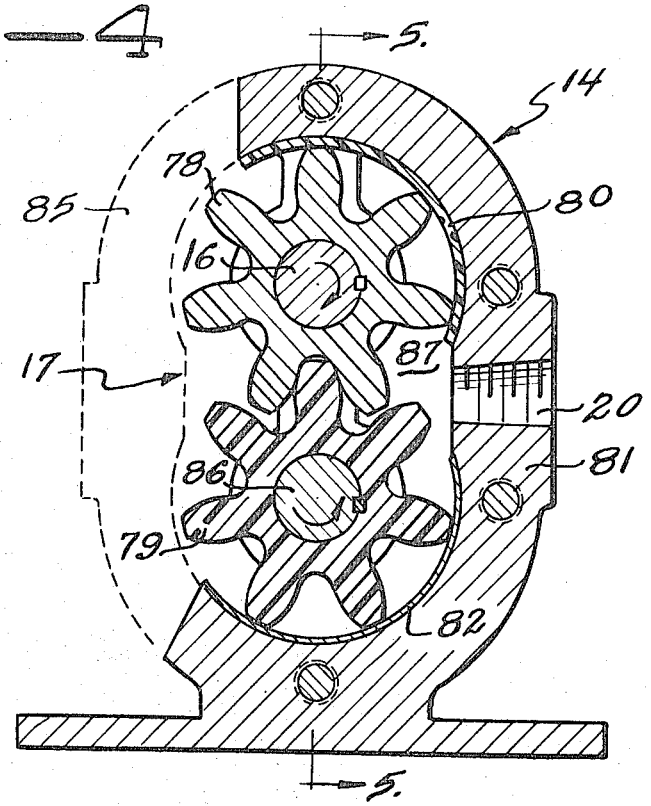
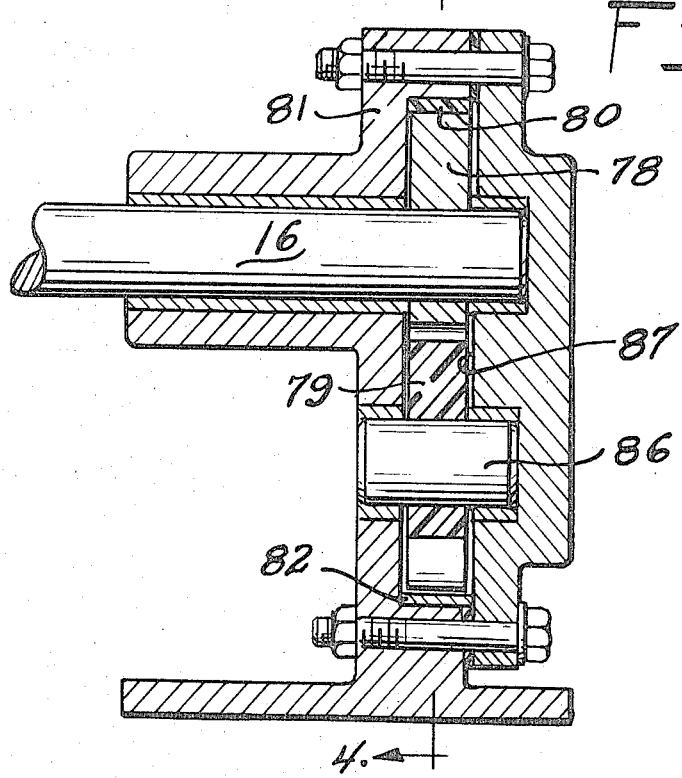

RECIRCULATING LIQUID-NITROGEN-COOLANT SYSTEM FOR SOLID-STATE LASERS

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates to a liquid-coolant system or a solid-state laser and is particularly concerned with a liquid-nitrogen-coolant system for solid-state lasers which permits the recirculation of the liquid-nitrogen.

Many materials, such as YAG:Nd$^{3+}$ (yttrium aluminum garnet) and ruby, which lase continuously at room temperature, exhibit a much narrower linewidth and lower threshold when operated at liquid-nitrogen temperature. Only when cooled to the liquid-nitrogen temperature range will other solids lase in either the continuous and/or pulsed modes; included among these are all of the substances known to date which lase in the 2-micron region of the spectrum. At that wavelength, high power is available, lead-sulfide detectors remain relatively efficient and, most importantly, many interesting semiconductors such as germanium, which are opaque to commercially available 1-micron sources, are transparent. Therefore, a high-power continuous wave and/or pulsed 2-micron source could be usefully applied to the study of Raman Spectra, photoluminescence, nonlinear optical effects, photoconductivity, and other phenomena in these semiconductors.

Cooling an optically pumped solid laser rod to liquid-nitrogen temperatures and continuously operating the laser while maintaining the liquid-nitrogen temperature poses many difficult problems. In particular, as the liquid-nitrogen passes over the surface of the laser rod, the liquid-nitrogen will also be heated. Radiation from the pump lamps heats the laser rod which in turn causes the liquid-nitrogen to boil, resulting in formation of bubbles within the liquid-nitrogen. The formation of bubbles within the liquid-nitrogen around the laser rod causes the light from the pump lamps to be refracted and hence not reach the laser rod. It is known that if the pressure of the liquid-nitrogen brought in contact with the laser rod is increased, the effective boiling point of the liquid-nitrogen is also increased. However, it was previously believed that mechanical pumping of liquid-nitrogen with a gear pump was not feasible because of heat losses. Some degree of success has been attained by pressurizing liquid-nitrogen and blowing the pressurized liquid-nitrogen through the laser head in contact with the solid laser rod. Some of the best results known to date were reported by D. P. Devor, B. H. Soffer, and G. E. Moss in their report, "High-Power, High Efficiency 2.1 Micrometer Laser Device," published as Technical Report AFAL-TR-71-181, Oct. 1971. This is an Air Force technical report available through Wright Patterson Air Force Base, Dayton, Ohio. Devor et al. report significant results including obtaining a 20-watt continuous wave output at 2.1 microns from an ABC-YAG, or alphabet-YAG, which is the name given to an yttrium-aluminum-garnet laser rod multiply doped with various concentrations of erbium, thulium, holmium and ytterbium. However, they report occasions of boiling in the liquid-nitrogen and conclude that an improved liquid-nitrogen-coolant system is needed. Devor et al. employed a once-through flowing precooled liquid-nitrogen system which was not designed to pump or recycle the liquid-nitrogen. In their conclusions and recommendations following the main body of their report, they point out that their system was not designed to recycle the liquid-nitrogen, which therefore limited the run duration of their tests.

Therefore, it is an object of the present invention to provide a liquid-coolant system for a solid-state laser which will permit recirculation of the liquid-coolant.

It is also an object of the present invention to provide a method and means for recirculating a liquid-coolant in contact with a solid-state laser rod to continuously cool the laser.

It is a further object of the present invention to provide a recirculating liquid-coolant system for a solid-state laser and a method which will permit cooling of the solid laser rod without boiling of the liquid-coolant in contact with the laser rod.

It is another object of the present invention to provide a liquid-nitrogen-coolant system and a corresponding method which will permit cooling of a solid laser rod to liquid-nitrogen temperature without boiling of the liquid-nitrogen in contact with the rod and which will permit recirculating the liquid-nitrogen to enable extended continuous operation of the laser.

Other objects and advantages of the present invention will become apparent upon reading the following description and with particular reference to the specific embodiment described herein below.

SUMMARY OF THE INVENTION

In accordance with the present invention, a liquid-coolant system for a solid-state laser permits the recirculation of the liquid-coolant through the laser without boiling the liquid-coolant in contact with the solid laser rod. The liquid-coolant is pumped by a mechanical gear pump, submerged within a reservoir of the liquid-coolant, at an increased pressure through a heat exchanger similarly submerged beneath the liquid-coolant where the pressurized liquid-coolant is cooled to the temperature of the liquid-coolant within the reservoir at atmospheric pressure. The pressurized and cooled liquid-coolant is then conducted through a conduit and connections to a laser head containing a solid laser rod. The pressurized and cooled liquid-coolant passes through the laser head over the surface of the solid laser rod so as to absorb heat from the solid laser rod whereby the liquid-coolant increases in temperature but not above the increased effective boiling point of the pressurized liquid. The liquid-coolant is then conducted through connections and a conduit to a second heat exchanger also submerged within the reservoir of the liquid-coolant. The second heat exchanger permits the gradual cooling of the heated pressurized liquid-coolant as it is returned to the reservoir of the liquid-coolant. The returned liquid-coolant can then be recirculated to the laser head.

BRIEF DESCRIPTION OF THE DRAWINGS

An understanding of the features and operation of the present invention can be obtained from a reading of the following description and with reference to the drawings, in which:

3

FIG. 1 is a schematic diagram of a recirculating liquid-coolant system in accordance with the present invention.

FIG. 2 is a cross section through a laser head employed in a specific embodiment of the coolant system of the present invention.

FIG. 3 is an enlarged portion of FIG. 2 showing the support of the solid laser rod.

FIG. 4 is a cross sectional view of a mechanical gear pump employed in a specific embodiment of the coolant system of the present invention taken along the line 4—4 of FIG. 5.

FIG. 5 is a sectional view taken along the line 5—5 of FIG. 4.

GENERAL DESCRIPTION OF THE INVENTION

Turning first to FIG. 1 for a general description of the coolant system in accordance with the present invention, there is shown a reservoir of liquid-coolant at atmospheric pressure, shown in FIG. 1 to be contained within a Dewar vessel 11 which is partially covered with a stainless steel top plate 12 to decrease the amount of coolant lost through evaporation. As an assist in the description of the present invention, line 13 represents the level of the liquid-coolant within vessel 11. A liquid-coolant pump 14, driven by electric motor 15 and connected thereto by drive shaft 16, is submerged beneath the surface of the liquid-coolant in the Dewar vessel 11. The intake indicated illustratively in FIG. 1 at 17 of liquid-coolant pump 14 is exposed to the liquid-coolant within the Dewar vessel 11 so that the pump 14 can draw from the reservoir of the liquid-coolant. A first heat exchanger 18 similarly is submerged beneath the surface of the liquid-coolant, the inlet 19 of this heat exchanger 18 being connected to the exhaust indicated at 20 of liquid-coolant pump 14. A coolant feeder conduit 21 connected to the outlet 22 of heat exchanger 18, exits from Dewar vessel 11 and leads to laser head 23 where conduit 21 is connected to the laser head inlet 24. A solid laser rod, not shown in FIG. 1, is supported within laser head 23, as will be described below. The liquid-coolant passes over the surface of the laser rod within laser head 23 and exits from laser head 23 through outlet 25. A return conduit 26 is connected to laser head outlet 25 and returns to Dewar vessel 11 where it is connected with the inlet 27 of a second heat exchanger 28 likewise submerged beneath the surface of the liquid-coolant within the Dewar vessel 11. The outlet 30 of the second heat exchanger 28 opens to the interior of the Dewar vessel 11 and permits return of the liquid-coolant to the reservoir from which the liquid-coolant may again be recirculated through the laser head 23.

In the operation of this liquid-coolant system, coolant pump 14 increases the pressure of the liquid-coolant above atmospheric pressure. This increase in pressure will increase the boiling point of the pressurized liquid-coolant. At the same time, the pumping action of pump 14 will increase the temperature of the pressurized liquid-coolant a small amount. To compensate for this, the liquid-coolant is passed through heat exchanger 18 submerged within the coolant at atmospheric pressure which cools the pressurized liquid-coolant to the temperature of the liquid-coolant at atmospheric pressure. When this pressurized and cooled liquid-coolant passes in contact with the laser rod within laser head 23, the coolant can absorb heat from the rod, consequently raising the coolant's temperature without causing the liquid-coolant to boil because of the increased boiling point of the pressurized liquid. While the pressurized liquid-coolant has its temperature increased above the boiling point of the liquid-coolant at atmospheric pressure, its temperature does not reach the increased effective boiling point of the pressurized liquid. The now heated pressurized liquid-coolant is returned to the body of liquid-coolant in the Dewar vessel 11 through the second heat exchanger 28 submerged beneath the surface of the coolant in order to gradually cool the now heated pressurized liquid-coolant back to the temperature of the liquid-coolant at atmospheric pressure. Since the liquid-coolant is returned to the reservoir of liquid-coolant, it can be recirculated through the coolant system over the laser rod to permit continuous cooling of the laser rod during extended operation of the laser.

DESCRIPTION OF SPECIFIC EMBODIMENT

While the invention is hereinafter described in connection with a particular specific embodiment, it will be understood that it is not intended to limit the invention to only that specific embodiment, but it is intended to cover all alternatives, modifications and equivalents as may be included within the spirit and scope of the invention as defined by the appended claims.

Referring now to FIG. 2, there is shown a laser head indicated generally at 23 which was designed and constructed for use in the liquid-coolant system of the present invention as previously described and illustrated in FIG. 1. The laser head 23 includes two main and separate elements, a central element, indicated generally at 31, holding the laser rod 29 and retaining the coolant-liquid, and an outer element, indicated generally at 32, constituting a vacuum jacket. Two spacing members 33 and 34 hold central element 31 and outer element 32 together in proper relative position, supporting the central element at points near its opposite ends such that the central element is disposed within and spaced from the outer element. The spacing members 33 and 34 are designed to minimize the heat leak between the central element 31, which is at the liquid-coolant temperature, and the outer element 32, which is at room temperature, and in the present specific embodiment are three-pointed stainless steel spacers.

The central element 31 includes an inner tube 35 which s composed of a light-transmitting material and in the present case was a thin pyrex tube. Inner tube 35 is vacuum sealed at each of its ends by end caps 36, best illustrated in FIG. 3 which is an enlarged portion of FIG. 2 showing the right-hand end portion of central element 31. Referring momentarily to FIG. 3, inner tube 35 is shown supported and sealed at its end by end cap 36. Pyrex inner tube 35 is sealed to stainless steel end cap 36 by an epoxy seal indicated at 37. End cap 36 has an aperture 83 therein, through which laser rod 29 extends in a sealed relationship therewith. The two end caps 36 are in sealed relation with laser rod 29 near the opposite ends thereof and support the laser rod within the inner tube 35. An indium O-ring 38 is pressed into a polished V-shape groove 39 surrounding the aperture 83 in the end cap 36 by a stainless steel bushing 40 also having therein an aperture 84 aligned with aperture 83 through which laser rod 29 likewise extends. Bushing 40 is drawn down on the O-ring 38 by a series of screws 41 each of which passes through the bushing 40 and threadably engages end cap 36. The indium O-ring 38 effects the sealed engagement between the laser rod 29 and the end caps 36. Indium is employed because the cold flowing properties of indium allow it to compensate for differences in expansion between the laser rod 29 and the other components. A radiation shield 43 surrounds the end cap 36 and the epoxy seal 37 between the end cap and the inner tube 35. The radiation shield 43 supports the end cap 36 and can be in threaded engagement therewith as in FIG. 3. The epoxy seal 37 is shielded from the pumping light source exterior to the outer element 32 by the radiation shield 43 in order to protect the integrity of the seal because the pumping light from the pumping light source for the laser could destroy the epoxy seal.

Referring again to FIG. 2, outer element 32 includes a middle portion which is an outer double-walled tube 44 composed of a light-transmitting material such as pyrex as in the present case, and two stainless steel end portions 45 and 46 on either end of outer double-walled tube 44. Outer double-walled tube 44 has spatially separated and concentric interior wall 44a and exterior wall 44b, both sealed at their ends with epoxy seals to stainless steel retainers 47 and 48 and sealed together thereby. Stainless steel retainer 47 is in flush abutment with end portion 45 permitting a series of screws 49 threadedly engaging retainer 47 through end portion 45 to cooperate with O-ring 53 in groove 54 in retainer 47 to achieve a sealing relationship between end portion 45 and retainer 47. Similarly, a sealed relationship is effected between retainer 48 and end portion 46. An inlet 55 and an outlet 56 associated with middle portion double-walled tube 44 communicate with the space between interior wall 44a and exterior wall 44b of the double-walled tube 44 and permit associated means connected thereto to circulate cooling fluid such as water between the walls 44a and 44b. The circulation of water between these pyrex walls prevents damage to them from heating caused by the exposure to the intense radiation from the pumping light source for the laser rod 29. A liquid-coolant inlet neck 57 and a liquid-coolant outlet neck 58 are provided in end portion 45 and end portion 46, respectively. The spacing members 33 and 34 lie around the radiation shields 43 at the opposite ends of central element 31 and support the central element 31 within the outer element 32 such that inner tube 35 is concentrically disposed within and spaced from interior wall 44a of outer double-walled tube 44.

Liquid-coolant inlet neck 57 in end portion 45 and liquid-coolant outlet neck 58 in end portion 46 are sealed by liquid-coolant inlet cap 59 and liquid-coolant outlet cap 60, respectively. Referring to inlet neck 57 and inlet cap 59 as an example, a sealed relationship is achieved between inlet neck 57 and inlet cap 59 by functional cooperation between O-ring 61 in groove 62 in inlet neck 57 and a series of screws 63 through inlet cap 59 threadedly engaging inlet neck 57. Laser head liquid-coolant inlet tube 24a passes through inlet cap 59 on inlet neck 57 in sealed relation with the inlet cap 59. In this specific embodiment, a copper tube laser head liquid-coolant inlet tube 24a is sealed to stainless steel inlet cap 59 by a solder seal 65 near the end of inlet cap 59. Similarly, laser head liquid-coolant outlet tube 25a passes through outlet cap 60 on outlet neck 58 in sealed relation with the outlet cap 60. Laser head liquid-coolant inlet tube 24a and laser head liquid-coolant outlet tube 25a communicate with the interior of sealed inner tube 35 through the end caps 36 thereof. As can be seen from the dotted line representation in FIG. 3, laser-head liquid-coolant outlet tube 25a communicates with the interior of inner tube 35 through end cap 36 to permit the flow of liquid coolant through the inner tube over the surface of laser rod 29 in contact therewith. A similar structural relationship exists for liquid-coolant inlet 24a and the interior of inner tube 35.

Gold-plated copper braids 66 thermally connect radiation shields 43 to the laser head liquid-coolant inlet tube 24a and laser head liquid-coolant outlet tube 25a, respectively, in order to heat-sink the radiation shields to the liquid-coolant temperature. The radiation shields are copper shields which are silver-plated on one end to reflect pump radiation from the pumping light source, exterior to outer element 32 which source pumps and excites laser rod 29 through light-transmitting outer double-walled tube 44 and inner tube 35, and gold-plated on the other to assure good thermal contact with the gold-plated copper braid 66.

Outer element 32 is sealed at its ends by laser head fittings 67 and 71. Referring still to FIG. 2 for a description of the fittings employed in the specific embodiment, outer element 32 is sealed at one end by fitting 67 snugly sliding into end portion 45 and achieving a sealed relationship therewith by means of O-ring 68 in grooves 69 in fitting 67. Fitting 67 has a Brewster window 70 mounted therein in order that the laser light generated by pumping laser rod 29 may propagate from the laser head 23. The sealed relation between fitting 67 and end portion 45, whereby fitting 67 is slid into end portion 45 rather than threaded, gives a degree of rotational freedom to the fitting 67, permitting rotation thereof to properly align the Brewster window 70 in relation to laser rod 29. Outer element 32 is sealed at the opposite end by fitting 71 snugly sliding into end portion 46 and similarly achieving a sealed relationship therewith by means of O-rings 52. Fitting 71 is coupled with a bellows system which includes a mirror 73 supported within a mirror mount 72 which is joined to the fitting 71 by two separate bellows 74 and 75 separated by a brass tube 76. The brass tube and bellows coupling the fitting 71 to the mirror mount 72 gives the mirror 73 freedom to move in its own plane and thereby permits adjustment and alignment of the mirror relative to laser rod 29. If an unpolarized output is desired, a fitting such as fitting 71 with associated mirror mount 72 may be used at both ends of the laser head 23 with such an assembly containing therein a partially transmitting mirror used in place of the fitting 67 with Brewster window 70.

A vacuum port 77 communicating through outer element 32 with the interior of the laser head 23 including the space between inner tube 35 and the interior wall 44a of outer double-walled tube 44 permits associated vacuum pump means to evacuate the interior of the laser head 23 and thereby thermally insulate inner tube 35 from outer double-walled tube 44.

Referring now to FIGS. 4 and 5, there is shown a liquid-coolant pump 14 employed in the specific embodiment of the present invention. Liquid-coolant pump 14 is shown revealing the interior components of the pump which have been somewhat modified in important respects for the practice of the present invention. Liquid-coolant pump 14 is a mechanical gear pump driven by stainless steel drive shaft 16 which extends through the pump body 81 to the interior cavity 87 thereof in a sealed rotational relationship therewith. A stainless steel cog gear 78, disposed within the cavity 87 of pump body 81, is rotationally mounted on drive shaft 16 in operative relation therewith. A fiber cog gear 79 likewise disposed within the cavity 87 of pump body 81, is rotationally mounted on free rotational shaft 86 in operative relation therewith and meshes with stainless steel gear 78. A fiber gasket 80 lies between the stainless steel gear 78 and a portion of the interior surface of the body 81 of pump 14 and prevents grating contact between the gear 78 and the pump body 81 thereby greatly reducing the wear of the stainless steel gear 78. As depicted in FIG. 4, as drive shaft 16 is driven in a clockwise rotation, stainless steel gear 78 mounted thereon is also rotationally driven in a clockwise direction, fiber gear 79 in mesh with stainless steel gear 78 being rotationally driven in a counterclockwise direction thereby. A pump intake indicated at 17 lies on one side of the pump body 81 and opens to the cavity 87 facing the meshing gears 78 and 79 in a direction perpendicular to their axes of rotation. Pump intake 17 is sized to largely expose the gears 78 and 79 to the reservoir of liquid-coolant in which the pump 14 is submerged, thereby preventing vapor lock and providing for more efficient cooling of the gears. The pump exhaust 20 lies on the opposite side of the pump body 81 from the pump intake 17. The pump exhaust 20 likewise opens to the cavity 87 of the pump body 81 facing the meshing gears 78 and 79 transverse the gears from the pump intake on a line through the meshing portions of the gears. Stainless steel gear 78 and fiber gear 79 are sized so as to rotate in very close tolerance with the interior surfaces of the pump body 81, gasket 80 being considered an extension of the interior surface in the case of stainless steel gear 78. As the gears 78 and 79 are rotationally driven, liquid-coolant is swept by the gears 78 and 79 from the intake 17 between the interior surface of the pump body and each of the two gears to the pump exhaust 20 from which the liquid-coolant is mechanically pumped by the continued rotation of the gears sweeping additional coolant to the exhaust.

A mechanical gear pump in which the gears have not been specially sized to permit operation at liquid-nitrogen temperatures can be modified so as to correspond with the above described pump 14 and enable mechanical pumping of liquid-nitrogen as in the present case. A stainless steel shim stock 82 is placed between the fiber gear 79 and the body 81 of the pump to compensate for the large thermal contraction of the parts, and fiber gear 79 in particular, when subject to liquid-nitrogen temperature, and to provide close tolerance between the pump body and the fiber gear at liquid-nitrogen temperature. A close tolerance is also obtained between stainless steel gear 78 and the pump body 81 by use of additional or thicker fiber gaskets 80. The pump intake 17 is sized to expose the gears 78 and 79 by removing or cutting away a portion 85 of the inlet side of the pump 14, portion 85 being shown in dotted lines in FIG. 4. Such modifications permit use of commercially available pumps in the practice of the present invention.

Tests were conducted to determine the cooling characteristics of the recirculating liquid-coolant system in accordance with the specific embodiment of the present invention described hereinabove. Both a YAG:Nd$^{3+}$ and an ABC-YAG laser rod, which give continuous wave emission at 1.06 and 2.1 microns, respectively, were employed in these tests. The laser heads were inserted in a pumping cavity which was typical of those which are well known in the art and the lasers were pumped with two 1.5-kilowatt tungsten-iodine lamps. A 1/3-horsepower variable-speed DC motor which builds up a maximum of 2.1 kilograms per square centimeter pressure of liquid nitrogen at 1,740 rpm was employed as motor 15. The particular modified pump 14 used was a stainless steel fiber gear pump, Model 2LOE-S, distributed by Gelber Pumps, 5806 North Lincoln Avenue, Chicago, Ill., which was modified by cutting away the inlet side of the pump and inserting therein a stainless steel shim stock 82 between the fiber gear 79 and the body of the pump 81 as described above. Since ice particles form in the liquid nitrogen, a filter fabricated from a wire mesh, not shown in the drawings, was placed to surround the pump 14 to prevent the ice particles from clogging the liquid-nitrogen system. Tests showed that 280 watts were generated in both the YAG: Nd$^{3+}$ and ABC-YAG units for 3-kilowatt electrical input to the lamps. Of this amount, contribution from heat leaks inside the laser head 23 and conduits 21 and 26 was about 50 watts. The system made it possible to operate the liquid-nitrogen pump 14 at a reduced speed. To properly cool the laser rod 29, it was found that the pump 14 needed to develop only 1.6 kilograms per square centimeter pressure, corresponding to a flow rate of 37 cc per second. The liquid boiling rate in the stainless steel Dewar 11 was found to be 3.3 cc per second, with the mechanical power necessary to move the liquid contributing 1.1 cc per second to the evaporation rate. The theoretical lower limit, which corresponds to 280 watts of power being removed from the laser head, was determined to be 1.4 cc per second. Therefore, with a 3-kilowatt electrical input to a pair of tungsten-iodine pump lamps coupled to either of the two laser rods, the measured liquid-nitrogen consumption rate was 3.3 cc per second at a flow rate of 37 cc per second. An automatic fill system, not illustrated in the drawings, connected to a 210 liter Dewar vessel 11 therefore made it possible to operate the laser continuously for 17 hours. While the particular tests conducted on the recirculating liquid-coolant system employed nitrogen as the liquid coolant, other liquid coolants may also be employed, liquid oxygen or a freon such as $CF_4$ as examples. Liquid nitrogen was chosen for safety considerations as well as for simplicity. Liquid nitrogen was also chosen as particular interest was directed toward cooling a lasing material to liquid-nitrogen temperatures in order to obtain emissions in the 1 to 2 micron region, which is of particular interest in the study of Raman Spectra.

The embodiments of the invention in which an exclusive property or privilege is claimed are defined as follows:

1. A recirculating liquid-coolant system for solid-state lasers comprising:
   a. a Dewar vessel containing liquid-coolant;
   b. a liquid-coolant pump, including an intake and an exhaust, submerged beneath said coolant in said Dewar vessel, the intake of said liquid-coolant pump being exposed to the liquid-coolant within said Dewar vessel;

c. a first heat exchanger, including an inlet and an outlet, submerged beneath the liquid-coolant in said Dewar vessel, the exhaust of said liquid-coolant pump connected to the inlet of said first heat exchanger;

d. a solid laser rod;

e. a laser head supporting said solid laser rod therein and including a liquid-coolant inlet and a liquid-coolant outlet disposed to provide coolant access to said laser rod;

f. a liquid-coolant feeder conduit interconnecting the outlet of said first heat exchanger and the inlet of said laser head;

g. a second heat exchanger, including an inlet and an outlet, submerged beneath the surface of the liquid-coolant within said Dewar vessel, the outlet of said second heat exchanger opening to the interior of said Dewar vessel; and h. a liquid-coolant return conduit interconnecting the outlet of said laser head and the inlet of said second heat exchanger.

2. The system in accordance with claim 1 wherein said laser head supporting said solid laser rod comprises:

a. a central element housing said laser rod, said central element including a sealed inner tube portion composed of a light-transmitting material, and means or supporting said solid laser rod within said central element to extend through the ends of said sealed inner tube portion in sealed relationship therewith;

b. a sealed tubular outer element including a portion composed of light-transmitting material;

c. spacing members supporting said central element within said outer element in spaced relation thereto such that said central element sealed inner tube portion is concentrically disposed within the light-transmitting portion of said outer element;

d. liquid-coolant inlet means and liquid-coolant outlet means passing through said outer element in sealed relation therewith and communicating with the interior of said central element sealed inner tube portion through the opposite ends thereof in sealed relation therewith to permit liquid coolant access to said laser rod;

e. a light-transmitting window sealingly mounted in one end of said sealed outer element, said window aligned with said laser rod to permit propagation of the laser light from said laser head; and f. evacuation means communicating with the interior of said outer element to permit evacuation thereof including the space between said central element and said outer element.

3. The system according to claim 2 wherein said sealed tubular outer element includes: a middle portion, said middle portion including an outer double-walled tube composed of a light-transmitting material, the walls of said outer double-walled tube being sealed together at their ends; an inlet and an outlet associated with said outer double-walled tube and communicating with the space between the double-walls to provide cooling fluid access therebetween; two end portions sealingly engaging said middle portion at the opposite ends thereof, said liquid-coolant inlet means and said liquid-coolant outlet means sealingly passing through said outer element through the opposite two said end portions respectively.

4. The system according to claim 3 wherein said means for supporting said laser rod within said central element comprise: end caps engaging said inner tube at each of its two ends, each of said end caps including an aperture therethrough accepting said laser rod in a supportive relationship therewith near the opposite ends thereof; sealing means effecting a sealed supportive relationship between said end caps and said laser rod; and seals bonding said end caps to said inner tube at its ends in vacuum sealed relationship therewith; and wherein said central element further includes radiation shields surrounding each end cap and the seal between the end cap and said inner tube and engaging said end caps, said spacing members engaging said radiation shields to support said central element within said outer element.

5. The system in accordance with claim 4 wherein said sealing means between said end caps and said laser rod comprise: V-shaped grooves surrounding said apertures in said end caps of said inner tube; indium O-rings disposed in said grooves and engaging said laser rod extending through said apertures; stainless steel bushings engaging said O-rings and pressing said O-rings in said V-shaped grooves to effect a sealable engagement between said laser rod and said end caps.

6. The system in accordance with claim 4 wherein said liquid-coolant inlet means and liquid-coolant outlet means comprise: a liquid-coolant inlet neck on one said end portion of said outer element and a liquid-coolant outlet neck on the opposite said end portion; a liquid-coolant inlet cap and a liquid-coolant outlet cap in sealed engagement with said liquid-coolant inlet neck and said liquid-coolant outlet neck respectively; a liquid-coolant inlet tube passing through said inlet cap and said inlet neck in sealed relation with said inlet cap and sealingly communicating with the interior of said inner tube through an end cap thereof; and a liquid-coolant outlet tube passing through said outlet cap and said outlet neck in sealed relation with said outlet cap and sealingly communicating with the interior of said inner tube through the opposite end cap thereof.

7. The system in accordance with claim 6 wherein said seals bonding said end caps to said inner tube are epoxy seals; and wherein said laser head further comprises gold-plated copper braids thermally connecting each of said radiation shields surrounding said seals and said end caps to the liquid-coolant inlet tube and liquid-coolant outlet tube respectively to heat sink the radiation shields.

8. The system in accordance with claim 7 wherein said liquid-coolant is liquid-nitrogen.

9. The system according to claim 8 wherein said liquid-coolant pump is a mechanical gear pump for pumping said liquid-nitrogen to said laser head at a pressure above atmospheric pressure.

10. The system in accordance with claim 9 wherein said pump comprises:

a. a pump body defining a pump cavity therein;

b. a drive shaft extending through said pump cavity through said pump body in sealed rotational relationship therewith;

c. a freely rotating second shaft extending through said pump cavity parallel to said drive shaft;

d. a stainless steel cog gear mounted within said cavity on said drive shaft in operative rotational cooperation therewith;

e. a fiber cog gear mounted within said cavity on said second shaft in operative rotational cooperation therewith and in meshing engagement with said stainless steel gear; said stainless steel gear and said fiber sized so as to rotate in very close tolerance with the interior surface of said pump body;

f. a pump intake disposed on one side of said body opening to said cavity facing said meshing gears in a direction perpendicular to their axes of rotation, said intake sized to expose said stainless steel gear and said fiber gear to the liquid-coolant in which said pump is submerged, and providing liquid-coolant access to said gears;

g. a pump exhaust disposed on the opposite side of said body opening to said cavity facing said meshing gears transverse the gears from said intake on a line through the meshing portions of the gears, said exhaust communicating with said intake through that portion of said cavity between said gears and the interior surface of said pump body.

11. The system in accordance with claim 10 wherein said pump further comprises: a stainless steel shim stock inserted between said fiber gear and said pump body and a fiber gasket inserted between said stainless steel gear and pump body, said shim stock and said gasket serving to compensate for the contraction of said gears and to maintain the close tolerance between said gears and the effective interior surface of said pump body when said pump is at liquid-nitrogen temperature.

12. A method of cooling a solid-state laser rod comprising:

a. pumping a liquid-coolant from a reservoir of said coolant at atmospheric pressure to an increased pressure so as to raise the boiling point of said coolant at the increased pressure;

b. cooling said coolant at the increased pressure to the temperature of the coolant at atmospheric pressure to lower the temperature of said coolant at the increased pressure below its effective boiling point;

c. continuously passing said pressurized and cooled coolant over the surface of the solid laser rod at the increased pressure to cool the laser rod and to absorb any heat generated by the laser rod during operation of the laser and raise the temperature of the coolant at the increased pressure, said continuous passing of coolant over the laser rod being effected at a rate to maintain the temperature of the coolant at the increased pressure below its effective boiling point preventing boiling of the liquid coolant passing over the laser rod;

d. returning said heated coolant at the increased pressure to the reservoir of coolant at atmospheric pressure; and e. continuously so recirculating the coolant between the reservoir and the laser.

* * * * *